US007221998B2

(12) United States Patent
Brust et al.

(10) Patent No.: US 7,221,998 B2
(45) Date of Patent: May 22, 2007

(54) DETERMINING PALLET CASE CONFIGURATIONS FOR PLACEMENT BY A ROBOT

(76) Inventors: David Brust, 56E Foxfire Dr., Asheville, NC (US) 28803; Angela I. Robertson, 17 S. Ridge Pl., Arden, NC (US) 28704; Frederick John Stingel, III, 614 Holt La., Asheville, NC (US) 28803; Jeffrey W. Stingel, 1408 Kenton La., Asheville, NC (US) 28803

( * ) Notice: Subject to any disclaimer, the term of this patent is extended or adjusted under 35 U.S.C. 154(b) by 0 days.

(21) Appl. No.: 11/040,682

(22) Filed: Jan. 21, 2005

(65) Prior Publication Data

US 2005/0125101 A1 Jun. 9, 2005

Related U.S. Application Data

(62) Division of application No. 10/272,661, filed on Oct. 17, 2002, now Pat. No. 6,871,116.

(51) Int. Cl.
*G06F 19/00* (2006.01)

(52) U.S. Cl. .................. 700/245; 700/247; 414/793.8; 294/87.1; 250/566; 209/566

(58) Field of Classification Search ................ 700/245, 700/247; 294/87.1; 209/566
See application file for complete search history.

(56) References Cited

U.S. PATENT DOCUMENTS 2,715,950 A 8/1955 Law
3,011,621 A 12/1961 Byrnes et al.
3,153,487 A 10/1964 Hoellen
3,262,584 A 7/1966 Hayford, Jr. et al.
3,379,321 A 4/1968 Weir
3,436,968 A 4/1969 Unger et al.
3,517,831 A 6/1970 Hahn
3,528,213 A 9/1970 Mottweiler
3,643,798 A 2/1972 Krupotich (Continued)

FOREIGN PATENT DOCUMENTS

DE 4021665 A1 1/1992

(Continued)

OTHER PUBLICATIONS

ABB, "IRB 7600 Power Robot", 2003, Internet, pp. 1-2.

(Continued)

*Primary Examiner*—Thomas Black
*Assistant Examiner*—McDieunel Marc
(74) *Attorney, Agent, or Firm*—Akerman Senterfitt; Michael K. Dixon

(57) ABSTRACT

A method of determining pallet layers for placement by a material handling system robot can include identifying cases for inclusion in a pallet and identifying case dimension information for the cases. Using the case dimension information, the cases can be classified into at least one group, wherein each group is defined by a height range such that cases classified within a group have a height within the height range associated with that group. Cases of one of the groups can be assigned to locations within a pallet layer, wherein the pallet layer has an area within a predefined area range.

31 Claims, 10 Drawing Sheets

U.S. PATENT DOCUMENTS

| | | | | |
|---|---|---|---|---|
| 3,727,369 | A | 4/1973 | Lassig | |
| 3,731,782 | A | 5/1973 | Del Rosso | |
| 3,741,345 | A | 6/1973 | Sardis | |
| 3,757,939 | A | 9/1973 | Henig | |
| 3,815,313 | A | 6/1974 | Heisler | |
| 3,994,407 | A * | 11/1976 | Von Gal et al. | 414/564 |
| 4,161,094 | A | 7/1979 | Blidung et al. | |
| 4,166,525 | A | 9/1979 | Bruno | |
| 4,181,947 | A | 1/1980 | Krauss et al. | |
| 4,222,478 | A | 9/1980 | Gasser | |
| 4,239,434 | A | 12/1980 | Gannon | |
| 4,385,859 | A | 5/1983 | Goossens | |
| 4,479,187 | A | 10/1984 | Nara | |
| 4,501,528 | A | 2/1985 | Knapp | |
| 4,527,937 | A | 7/1985 | Tomasello, Jr. | |
| 4,542,808 | A | 9/1985 | Lloyd, Jr. et al. | |
| 4,543,970 | A | 10/1985 | Noh et al. | |
| 4,567,988 | A | 2/1986 | Weibel | |
| 4,607,651 | A | 8/1986 | Noh et al. | |
| 4,609,000 | A | 9/1986 | Noh et al. | |
| 4,609,001 | A | 9/1986 | Noh et al. | |
| 4,609,002 | A | 9/1986 | Noh et al. | |
| 4,612,946 | A | 9/1986 | Noh et al. | |
| 4,621,745 | A | 11/1986 | Grace | |
| 4,627,540 | A | 12/1986 | Takeda | |
| 4,638,171 | A | 1/1987 | Gassmann | |
| 4,641,271 | A | 2/1987 | Konishi et al. | |
| 4,656,591 | A | 4/1987 | Goldberg | |
| 4,672,553 | A | 6/1987 | Goldberg | |
| 4,692,876 | A | 9/1987 | Tenma et al. | |
| 4,746,255 | A | 5/1988 | Roccabianca et al. | |
| 4,786,229 | A | 11/1988 | Henderson | |
| 4,815,190 | A | 3/1989 | Haba, Jr. et al. | |
| 4,826,360 | A | 5/1989 | Iwasawa et al. | |
| 4,835,702 | A | 5/1989 | Tanaka | |
| 4,867,628 | A | 9/1989 | Ammon et al. | |
| 4,894,908 | A | 1/1990 | Haba, Jr. et al. | |
| 4,907,699 | A | 3/1990 | Butcher et al. | |
| 4,930,291 | A | 6/1990 | Boisseau | |
| 4,941,374 | A | 7/1990 | Focke | |
| 4,963,251 | A | 10/1990 | Bohm et al. | |
| 4,988,264 | A * | 1/1991 | Winski | 414/796 |
| 5,000,643 | A | 3/1991 | Tanaka et al. | |
| 5,018,073 | A | 5/1991 | Goldberg | |
| 5,056,294 | A | 10/1991 | Focke | |
| 5,096,367 | A * | 3/1992 | Winski | 414/801 |
| 5,105,600 | A | 4/1992 | DePoint, Jr. et al. | |
| 5,106,259 | A | 4/1992 | Anderson et al. | |
| 5,109,650 | A | 5/1992 | Hogenkamp | |
| 5,109,973 | A | 5/1992 | Hirano et al. | |
| 5,119,732 | A | 6/1992 | Lisy | |
| 5,119,954 | A | 6/1992 | Svyatsky et al. | |
| 5,175,692 | A | 12/1992 | Mazouz et al. | |
| 5,203,671 | A | 4/1993 | Cawley et al. | |
| 5,211,528 | A | 5/1993 | Kato | |
| 5,220,511 | A | 6/1993 | Speckhart et al. | |
| 5,230,205 | A | 7/1993 | Hautemont | |
| 5,230,206 | A | 7/1993 | Christ | |
| 5,269,645 | A | 12/1993 | Winski | |
| 5,271,703 | A | 12/1993 | Lindqvist et al. | |
| 5,281,081 | A | 1/1994 | Kato | |
| 5,299,691 | A | 4/1994 | Winski | |
| 5,303,482 | A | 4/1994 | Yamashita et al. | |
| 5,310,396 | A | 5/1994 | Momoi et al. | |
| 5,321,885 | A | 6/1994 | Hino et al. | |
| 5,322,406 | A | 6/1994 | Pippin et al. | |
| 5,328,319 | A | 7/1994 | Fadaie | |
| 5,359,830 | A | 11/1994 | Olson et al. | |
| 5,363,310 | A | 11/1994 | Haj-Ali-Ahmadi et al. | |
| 5,363,867 | A | 11/1994 | Kawano et al. | |
| 5,372,472 | A | 12/1994 | Winski | |
| 5,385,438 | A | 1/1995 | Fadaie | |
| 5,406,770 | A | 4/1995 | Fikacek | |
| 5,411,151 | A | 5/1995 | Sasada | |
| 5,412,923 | A | 5/1995 | Lashyro et al. | |
| 5,426,921 | A | 6/1995 | Beckmann | |
| 5,427,252 | A * | 6/1995 | Teegarden et al. | 209/540 |
| 5,443,346 | A | 8/1995 | Murata et al. | |
| 5,454,688 | A | 10/1995 | Pippin | |
| 5,459,670 | A | 10/1995 | Johnson et al. | |
| 5,475,604 | A | 12/1995 | Nagamatsu | |
| 5,501,571 | A | 3/1996 | Van Durrett et al. | |
| 5,636,966 | A | 6/1997 | Lyon et al. | |
| 5,720,157 | A | 2/1998 | Ross | |
| 5,733,098 | A | 3/1998 | Lyon et al. | |
| 5,806,574 | A | 9/1998 | Yamashita et al. | |
| 5,903,464 | A | 5/1999 | Stingel, Jr. et al. | |
| 5,908,283 | A | 6/1999 | Huang et al. | |
| 5,934,864 | A | 8/1999 | Lyon et al. | |
| 5,977,501 | A | 11/1999 | Werkheiser et al. | |
| 5,996,316 | A | 12/1999 | Kirschner | |
| 6,003,917 | A | 12/1999 | Tygard | |
| 6,077,017 | A | 6/2000 | Durant | |
| 6,120,241 | A | 9/2000 | Huang et al. | |
| 6,134,482 | A | 10/2000 | Iwasaki | |
| 6,141,514 | A | 10/2000 | Inaba et al. | |
| 6,186,724 | B1 | 2/2001 | Hollander | |
| 6,201,203 | B1 * | 3/2001 | Tilles | 209/584 |
| 6,286,656 | B1 | 9/2001 | Huang et al. | |
| 6,290,454 | B1 | 9/2001 | Huang et al. | |
| 6,315,513 | B1 | 11/2001 | Harukawa et al. | |
| 6,325,586 | B1 | 12/2001 | Loy | |
| 6,398,476 | B1 | 6/2002 | Ando | |
| 6,425,226 | B1 | 7/2002 | Kirschner | |
| 6,450,751 | B1 | 9/2002 | Hollander | |
| 6,516,234 | B2 | 2/2003 | Kamiguchi et al. | |
| 6,558,102 | B2 | 5/2003 | Klein et al. | |
| 6,688,839 | B1 | 2/2004 | Hirschek et al. | |
| 6,699,007 | B2 | 3/2004 | Huang et al. | |
| 6,729,836 | B2 | 5/2004 | Stingel et al. | |
| 6,865,863 | B1 * | 3/2005 | Cook et al. | 53/441 |
| 6,868,847 | B2 | 3/2005 | Ainedter et al. | |
| 6,871,116 | B2 | 3/2005 | Brust et al. | |
| 6,911,300 | B2 | 6/2005 | Sato et al. | |
| 2003/0149644 | A1 | 8/2003 | Stingel et al. | |
| 2003/0176943 | A1 | 9/2003 | Stingel et al. | |
| 2003/0176944 | A1 | 9/2003 | Stingel et al. | |
| 2004/0074823 | A1 | 4/2004 | Brust et al. | |
| 2004/0220694 | A1 | 11/2004 | Stingel, III et al. | |
| 2005/0125101 | A1 | 6/2005 | Brust et al. | |

FOREIGN PATENT DOCUMENTS

| | | | |
|---|---|---|---|
| EP | 0209116 | | 1/1987 |
| EP | 0544733 | B1 | 6/1993 |
| EP | 0572830 | | 12/1993 |
| EP | 0761578 | B1 | 3/1997 |
| FR | 2620054 | | 3/1989 |
| GB | 248782 | | 7/1912 |
| GB | 210790 | | 6/1924 |
| WO | WO 98/23511 | A2 | 6/1998 |

OTHER PUBLICATIONS

ABB, "A New beginning for the end of the line", 2001, Internet.

Friedrich, "Increased reliability by effective use of sensor information: A shop floor application of sensor-aided robotic handling", 1995, IEEE, pp. 359-364.

Gillmore et al. "An expert system approach to palletizing unequal-sized containers", SPTE Applications of Artificial Intelligence VTT, Orlando, FL Mar. 1989, 10 pages.

Friedrich, "Increased Reliability by Effective Use of Sensor Information: A Shop Floor Application of Sensor-aided Robotic Handling", downloaded off Web on Dec. 6, 2005, 2 pages, http://csdl12.computer.org/persagen/DLabsToc.jsp?resourcePath=/dl/proceedings/&toc=co . . .
"IRB 7600 Power Robot References", downloaded off Web on Dec. 6, 2005, 3 pages, http://www.abb.com/global/seitp/seitp202.nsf/0/4BEB01934791F600C1256DC1004C59B . . .
George et al. "A Heuristic for Packing Boxes into a Container", Compul. & Ops. Res., vol. 7, pp. 147-156, 1980.
Dowsland "An exact algorithm for the pallet loading problem", European Journal of Operational Research, vol. 31, pp. 78-84, 1987.
Hodgson "A Combined Approach to the Pallet Loading Problem", IIE Transactions, vol. 14, No. 3 pp. 175-182, 1982.
Hodgson et al. "A Note on a Combined Approach to the Pallet Loading Problem", IIE Transactions, vol. 15, No. 3, pp. 268-271, 1983.
Smith et al. "An Algorithm to Optimize the Layout of Boxes in Pallets", J. Opl. Res. Soc., vol. 31, pp. 573-578, 1980.
Dowsland "The Three-Dimensional Pallet Chart: An Analysis of the Factors Affecting the Set of Feasible Layouts for a Class Two-Dimensional Packing Problems", J. Opl. Res. Soc., vol. 35, No. 10, pp. 895-905, 1984.
Dowsland "The Computer as an Aid to Physical Distribution Management", European Journal of Operational Research, vol. 15, pp. 160-168, 1984.

* cited by examiner

300

310

400

410

600

610

700

710

800

810

1000

1010

DETERMINING PALLET CASE CONFIGURATIONS FOR PLACEMENT BY A ROBOT

CROSS-REFERENCE TO RELATED APPLICATIONS

This application is a divisional application of, and accordingly claims the benefit of, U.S. application Ser. No. 10/272,661, filed in the U.S. Patent and Trademark Office on Oct. 17, 2002 now U.S. Pat. No. 6,871,116.

BACKGROUND

1. Technical Field

This invention relates to material handling systems and, more particularly, to building pallets using robotic systems.

2. Description of the Related Art

Material handling systems are used in a wide variety of environments to receive, store, and load cases of goods for delivery to customers. Generally, material handling systems include a data processor which can examine received customer orders to determine how many cases of customer selected product are to be included on a pallet for delivery to the customer.

Typically, full layer gantries and palletizers are utilized to build pallets having full layers of cases. A full layer of cases refers to a layer having a "footprint" or perimeter which approximates the perimeter of the pallet base, and thus, is substantially square or rectangular in shape. For example, full layer gantries can pull entire layers of cases from a supply pallet having a single product and transfer the entire layer to a pallet being built for delivery to a customer. The palletizer can form full layers of identical cases or cases that are substantially similar in height, width, and length, despite the fact that the cases are not identical in terms of content.

Cases which cannot be readily grouped into full pallet layers, particularly those cases which are not substantially similar in height, width, and/or length, are loaded onto the pallet one by one either by hand or using robots. Presently available pallet configuration systems designed for use with robots, however, often are unable to design or configure stable pallets. Rather, conventional pallet configuration systems attempt to maximize the usable volume of a pallet. Such systems allocate a predetermined volume to each pallet based upon the length and width of the pallet base that will be used to construct the physical pallet as well as the allowable height of a pallet as determined from the loading bay of a transport vehicle, the pallet height that can be accommodated by the automated material handling system, and/or other safety and equipment concerns.

To maximize pallet volume; conventional pallet configuration systems which work cooperatively with robots tend to abandon the concept of adding layers of cases to a pallet in favor of a columnar approach. That is, such systems typically add cases to pallets by stacking additional cases directly atop of cases already placed on the pallet. This technique results in pallets made up of a series of columns rather than layers of interlocking cases. Pallets built with columns of cases, however, can be unstable and subject to collapse. In fact, pallet instability often increases with column height. This stands in contrast to more secure methods of arranging cases using interlocking layers which resemble the layers of bricks within a masonry wall.

While volume usage may or may not be maximized using a columnar approach, the disregard for pallet stability can lead to significant problems with respect to safety and material handling system efficiency. Specifically, a finished pallet still must be transported to a stretch wrapper or other means of securing the cases on the pallet before the pallet can be loaded onto a transport vehicle. While in transit within the material handling system between the robot and the securing station, an unstable pallet can topple over. Such mishaps lead to significant increases with respect to product delivery time and cost. In particular, for each pallet that topples over or loses cases, the pallet building equipment may have to be stopped, the toppled pallet and/or cases must be cleared from the equipment line and rebuilt, and the pallet building equipment must be restarted. More importantly, when an unstable pallet topples over, the safety of those nearby is jeopardized.

SUMMARY OF THE INVENTION

The invention disclosed herein provides a solution for building pallets of cases within an automated material handling system. More particularly, those cases which cannot readily be added to a pallet as a full layer, for example by a palletizer or a full layer gantry, can be arranged and ordered for placement in a case by case fashion by a robot. One aspect of the present invention can include a method of determining pallet layers for placement by a material handling system robot. The method can include identifying cases for inclusion in a pallet and identifying case dimension information for the cases. Using the case dimension information, the cases can be classified into at least one group, wherein each group is defined by a height range such that cases classified within a group have a height within the height range associated with that group. The cases of one of the groups can be assigned to locations within a same pallet layer, wherein the pallet layer has an area within a predefined area range. The pallet can be built as specified by the assigned case locations using an automated material handling system configured with the robot.

The method further can include marking cases assigned to a pallet layer as being unavailable, and for cases that are not marked as available, performing the classifying step and the assigning step to form additional pallet layers. The assigning step can assign cases to each layer such that no column of more than a predetermined number of cases in height is formed in the pallet layers to be placed by the robot. The pallet can be built as specified by the assigned case locations using an automated material handling system configured with a robot.

Notably, the pallet layers can be configured such that an area of one of the layers is less than or equal to an area of another layer immediately beneath. Pallet layers also can be configured such that the area of one of the pallet layers is greater than the area of another layer immediately beneath. Case splits can be combined into a single virtual case for treatment as a single case for the classifying and assigning steps. The virtual case can be formed of two smaller cases placed side by side or stacked vertically one on top of the other. The virtual case or cases can be identified after assigning the virtual case or cases to a location within a pallet. The virtual cases can be separated into constituent case splits. Cases of the groups also can be sorted according to height such that the assigning step assigns taller cases of a group to corner locations of the pallet layer.

According to another embodiment of the present invention, cases of each group can be compared with at least one pallet layer template specifying an arrangement of cases forming a pallet layer. In that case, the assigning step can include assigning cases of at least one of the groups to a same layer of the pallet according to a matched pallet layer template. Notably, if the pallet has been assigned at least one layer of cases which are to be secured, the method can include comparing cases of at least one group with pallet layer templates designated for pallets having secured layers of cases. The pallet can be built as specified by the assigned case locations using an automated material handling system configured with the robot.

The method also can include assigning cases of at least one of the groups to a different layer of the pallet according to a matched pallet layer template and orienting the different layer so that the orientation of the different layer is substantially perpendicular to the orientation of a layer beneath the different layer. Additionally, cases assigned to a pallet layer can be marked as unavailable. For cases which are available, the classifying step and the assigning step can be performed to form additional pallet layers wherein the assigning step assigns cases to each layer such that no column of more than a predetermined number of cases in height is formed in the pallet layers to be placed by the robot. The pallet can be built as specified by the assigned case locations using an automated material handling system configured with the robot.

The layer determined in the assigning step can be limited to a perimeter which does not substantially exceed a perimeter of a pallet base. The perimeter of the layer also can be less than the perimeter of the pallet base. In any event, the pallet can be built as specified by the assigned case locations using an automated material handling system configured with a robot.

Similar to the embodiment previously discussed, case splits can be combined into one or more virtual cases for treatment as a single case for the comparing and assigning steps. The virtual case or cases can be identified after assigning the virtual case to a location within a pallet and separating the virtual case into constituent case splits.

The spacing between each case of the layer can be adjusted to accommodate a robotic case grasping mechanism. Notably, cases of a group can be matched to a pallet layer template specifying a case arrangement for a higher number of cases before matching cases of the group to a pallet layer template specifying a case arrangement for a smaller number of cases. If the cases of a group match more than one pallet layer template, a pallet layer template specifying a largest number of cases can be selected.

The method further can include identifying at least one exception case within the list of cases, assigning the at least one exception case to an exception layer, and adding at least one of an additional exception case or a non-exception case to the exception layer as specified by an exception pallet layer template.

Cases of the groups can be sorted according to height. Accordingly, the assigning step can include assigning taller cases of a group to corner locations of the pallet layer. If cases of a group match more than one pallet layer template, a pallet layer template which produces a pallet layer having the largest area can be selected.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a solution for building pallets of cases within an automated material handling system. In particular, the present invention can determine an arrangement of cases to be added to a pallet in a case by case fashion. Those cases which cannot readily be added to a pallet as a full layer, for example by a palletizer or a full layer gantry, can be arranged and ordered for placement by a robot. The present invention can calculate case and pallet layer placement whether for adding cases and layers to empty pallet bases or pallet bases which will have been loaded with one or more layers of cases prior to being routed to the robot.

Figure 1:
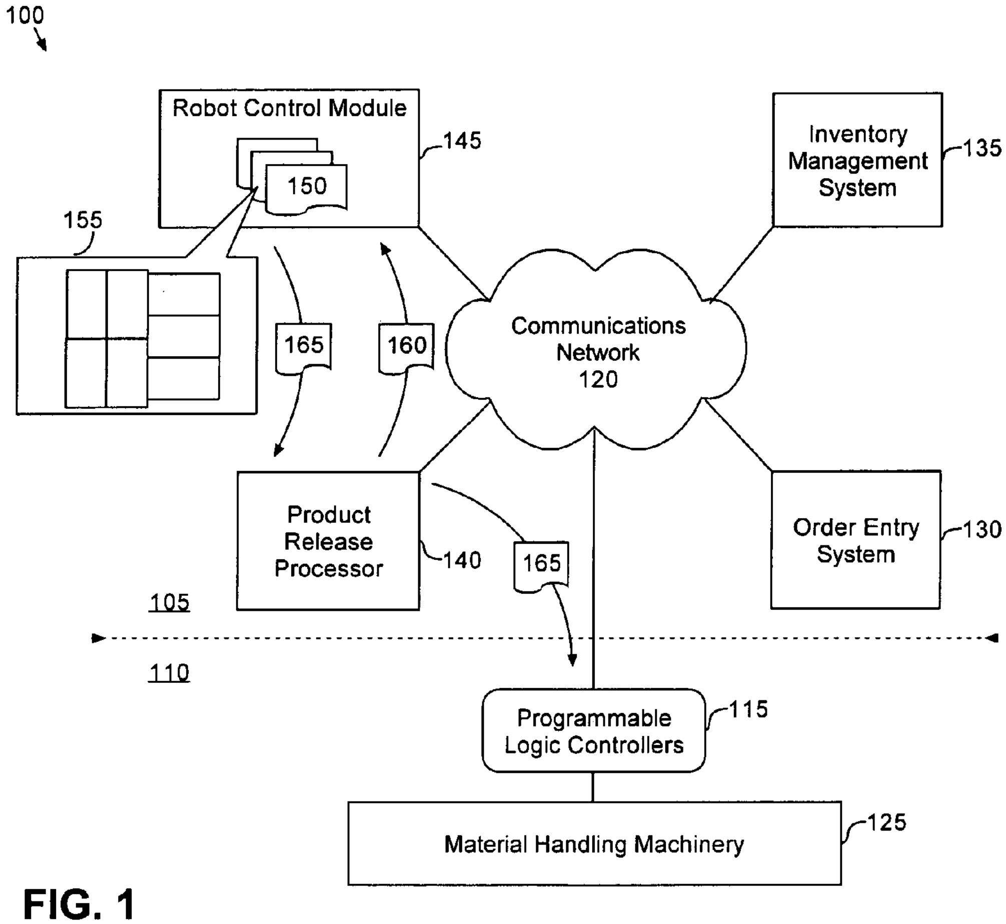
FIG. 1 is a schematic diagram illustrating an automated material handling system in accordance with the inventive arrangements disclosed herein.

FIG. 1 is a schematic diagram illustrating an automated material handling system 100 having a control system 105 and a material handling system 110. The control system 105 can be configured to determine pallet configuration data specifying arrangements of cases for placement on one or more pallets. By determining pallet configuration data, the control system 105 provides direction to the material handling system 110. The pallet configuration data can specify the case release sequence and routing of pallets and cases throughout the material handling system 110 when the pallet is physically constructed. More particularly, the pallet configuration data can specify the order in which cases are to be released from various storage locations, which storage locations are to release cases, the routing of cases throughout the material handling system 110, as well as the manner and order in which cases are to be added or placed onto pallets.

The material handling system 110, operating under direction of the control system 105, can physically construct pallets as specified by the pallet configuration data. The material handling system 110 can include programmable logic controllers 115, which can be communicatively linked to the control system 105 via the communications network 120, and material handling machinery 125 which is communicatively linked to the programmable logic controllers 115.

The material handling machinery 125 can include one or more palletizers for adding layers of cases to pallets. The layers can include cases of the same stock keeping unit (SKU) or cases of at least two different SKUs, but having substantially similar case measurements with respect to case length, width, weight, and height. Additionally, the palletizer can build pallet layers according to the geometry of cases to be included on the pallet.

The material handling machinery 125 can include a full layer gantry which can add full layers of cases of the same SKU to a pallet. Also, the material handling machinery 125 can include one or more robots which can add cases to a pallet individually. The term "robot" or "robotic system" as used herein, refers to a robotic case placement mechanism which is capable of placing a single case onto a pallet at a time. Although the present invention is not limited to a particular type of robot, one example is a robotic arm equipped with a case grasping mechanism.

The various components of the material handling machinery 125 can be fed cases either manually or by various case storage systems capable of providing full layers from pallets or providing individual cases. Regardless, the various components of the material handling machinery 125 can be interconnected via a conveyor system capable of selectively routing cases between each of the components of the material handling machinery 125.

The control system 105 can include an order entry system 130, an inventory management system 135, a product release processor 140, and a robot control module 145, each being communicatively linked via the communications network 120. The order entry system 130 can have stored therein received or entered orders for cases of products to be delivered to customers. The orders can specify the identity of products being ordered, the number of cases of product ordered, the identity of the customer, and the like. The inventory management system 135 can include inventory management data specifying which cases are in stock and which cases are queued within the material handling system 110 for use in building a pallet. For example, the inventory management system 135 can specify case attributes such as the length, width, and height of cases, the weight of cases, and the load bearing capacity of cases.

The product release processor 140 can access orders from the order entry system 130 as well as inventory management data from the inventory management system 135. The product release processor 140 can determine pallet configuration data specifying full pallets or partial pallets of full layers. More particularly, the product release processor 140 can examine a customer order received or accessed from the order entry system 130 and, using the inventory management data, determine whether sufficient inventory exists to build one or more pallets in fulfillment of the customer order. From the customer orders and inventory management data, the product release processor 140 can identify any full layers which can be used in the construction of a pallet.

The full layers, for example, can include cases of a single SKU, meaning full layers of identical cases, or full layers of substantially similar cases. Full layers of substantially similar cases can include layers of cases of one or more different SKUs or different products which have similar if not identical case dimensions with respect to length, width, and height. The product release processor 140 groups similar and identical cases for a given pallet. This grouping facilitates case routing throughout the material handling machinery 125 to the palletizer and the full layer gantry.

The product release processor 140 also determines pallet configuration data according to customers. The finished pallets can be unique to customer orders thereby enabling, for example, a driver to access all cases necessary to fulfill a particular customer order from one or more pallets in a single bay of a transport vehicle rather than accessing multiple truck bays to retrieve cases. The pallet configuration data determined by the product release processor 140 specifies only full layers of cases. More particularly, the product release processor 140 determines which cases are to be placed on a given pallet. The product release processor 140 also specifies locations of cases within the pallet to form full layers of cases. In consequence, not all of the pallets configured by the product release processor 140 are complete pallets. Unfinished pallet configuration data can be provided to the robot control module 145 for completion. As the unfinished pallet configuration data specifies which cases, whether placed or not, are to be placed on a particular pallet, the robot control module 145 can determine locations for the remaining unplaced cases of a pallet.

From the pallet configuration data, the robot control module 145 can identify the cases to be included in a particular pallet. The pallet configuration data also specifies which cases already have been assigned a location within the pallet, that is which cases can be added to the pallet resulting in full layers using either the palletizer or the full layer gantry. Accordingly, the pallet configuration data also specifies which cases have yet to be assigned a location within the pallet.

The robot control module 145 can complete the pallet configuration data for a given pallet thereby assigning each unassigned case to a designated position or location within the pallet. The robot control module 145 can classify the remaining cases into one or more groups according to case height. Cases belonging to a same group, and therefore having a similar height, can be used in the formation of a same pallet layer. The use of cases of similar height ensures that the resulting layer will provide a relatively flat surface for a next layer to be located atop of the newly determined layer, thereby promoting pallet stability.

Acceptable case heights for each case group can be specified as a height range. Accordingly, a system administrator can set the height variation of a layer to control the amount of variation in height from one case of a group to the next, and therefore a layer. For instance, cases can be classified into groups wherein the maximum height deviation or range for cases within a single group does not exceed one inch, one-half inch, one-quarter inch, or the like. The height ranges associated with each group can be unique to that group.

The robot control module 145 can include one or more pallet layer templates 150. The pallet layer templates define patterns of allowable case sizes which can be arranged to form a full layer. Because case height is already accommodated by the grouping of cases, each pallet layer template specifies an arrangement of cases according to case length, case width, and case orientation. The pallet layer templates, to be described herein in greater detail, can specify any of a variety of possible case arrangements which can accommodate any of a number of different case sizes depending upon the size of a pallet base and the dimensions of the cases to be placed onto the pallet base. For example, as shown, item 155 is a visual illustration of a pallet layer as specified by one of the pallet layer templates 150. In particular, item 155 depicts the top-down view, or the "footprint", of a 7 case pallet layer arrangement. The pallet layer includes 4 cases arranged in a cluster with 3 cases abutting the cluster. The orientation of the 3 abutting cases being substantially perpendicular to the orientation of the cluster of 4 cases.

In operation, the product release processor 140 can receive customer order information from the order entry system 130 and inventory management information from the inventory management system 135. The product release processor 140 can determine pallet configurations having full layers that can be built by the full layer gantry or the palletizer of the material handling machinery 125. Notably, some pallet configurations may not include any layers which can be built by the full layer gantry or the palletizer, and therefore, must be entirely configured by the robot control module.

Once the product release processor 140 determines pallet configuration data for a customer order, the pallet configuration data 160, also referred to as a case list, can be provided to the robot control module 145. As the robot control module 145 determines pallet configuration data for building a pallet case by case, the received pallet configuration data 160 can specify full layers, if any, for the pallet currently being configured. Accordingly, the robot control module 145 can receive the pallet configuration data 160, which also specifies those cases to be included within the current pallet, but which have yet to be assigned a location within the pallet.

The robot control module 145, using the pallet layer templates 150, can assign locations to the unassigned cases within the pallet. Any cases leftover from the comparison of pallet layer templates with the unassigned cases, can be provided to a volume maximization module or plug-in which can assign cases to locations of the pallet and determine pallet configuration data for those cases.

As noted, the pallet configuration data 160 fully specifies the layers which have been configured for the pallet by the product release processor 140 including the case dimensions, the X, Y, and Z coordinates of cases within the pallet, and the orientation for the assigned cases. Accordingly, the robot control module 145 can determine the height and volume that the unfinished pallet, if built, would occupy. Notably, the dimensions of the pallet base can be included in the calculation as the pallet base dimensions are known quantities. The robot control module 145 can be programmed to assign the remaining unassigned cases to the pallet so as not to exceed a predetermined volume and/or height threshold. Accordingly, the robot control module 145 can calculate the available volume and height of a pallet for purposes of adding additional layers and cases to ensure that the resulting physical pallet is built according to particular height and/or volume requirements.

The robot control module 145 can augment the pallet configuration data 160 with the newly determined pallet configuration data, and publish the resulting complete pallet configuration data 165. For example, the complete pallet configuration data 165 can be written to a data store such as a database, a table, or other memory which can be accessed by the product release processor 140. Accordingly, the product release processor can make the resulting pallet configuration data 165 available to the material handling system 105 so that the pallet can be built by the material handling machinery 125 in conformance with the finished pallet configuration data 165.

Although the various components of the control system 105, in particular the order entry system 130, the inventory management system 135, the product release processor 140, and the robot control module 145, are illustrated as separate application programs, it should be appreciated that the various components can be combined into one or more larger more complex application programs. For example, the product release processor 140 and the robot control module 145 can be combined into a single pallet configuration application program.

Case arrangements for pallets can be determined one pallet at a time. Still, although the system of FIG. 1 is discussed with reference to completing pallet configuration data for a single pallet, it should be appreciated that pallet configuration data can specify pallet configurations for more than one pallet. For example, the pallet configuration data can specify pallet configurations for as many pallets as may be required to fulfill a particular customer order or to fulfill one or more customer orders for a given delivery route despite pallets being configured individually. Also, those skilled in the art will recognize that pallet configuration data can indirectly specify case dimensions. For example, case lists or pallet configuration data can specify case identifiers such as SKUs which can be used to cross reference and retrieve case dimension data from other systems such as the inventory management system. Accordingly, the pallet configuration data need not explicitly specify case dimensions.

Figure 2:
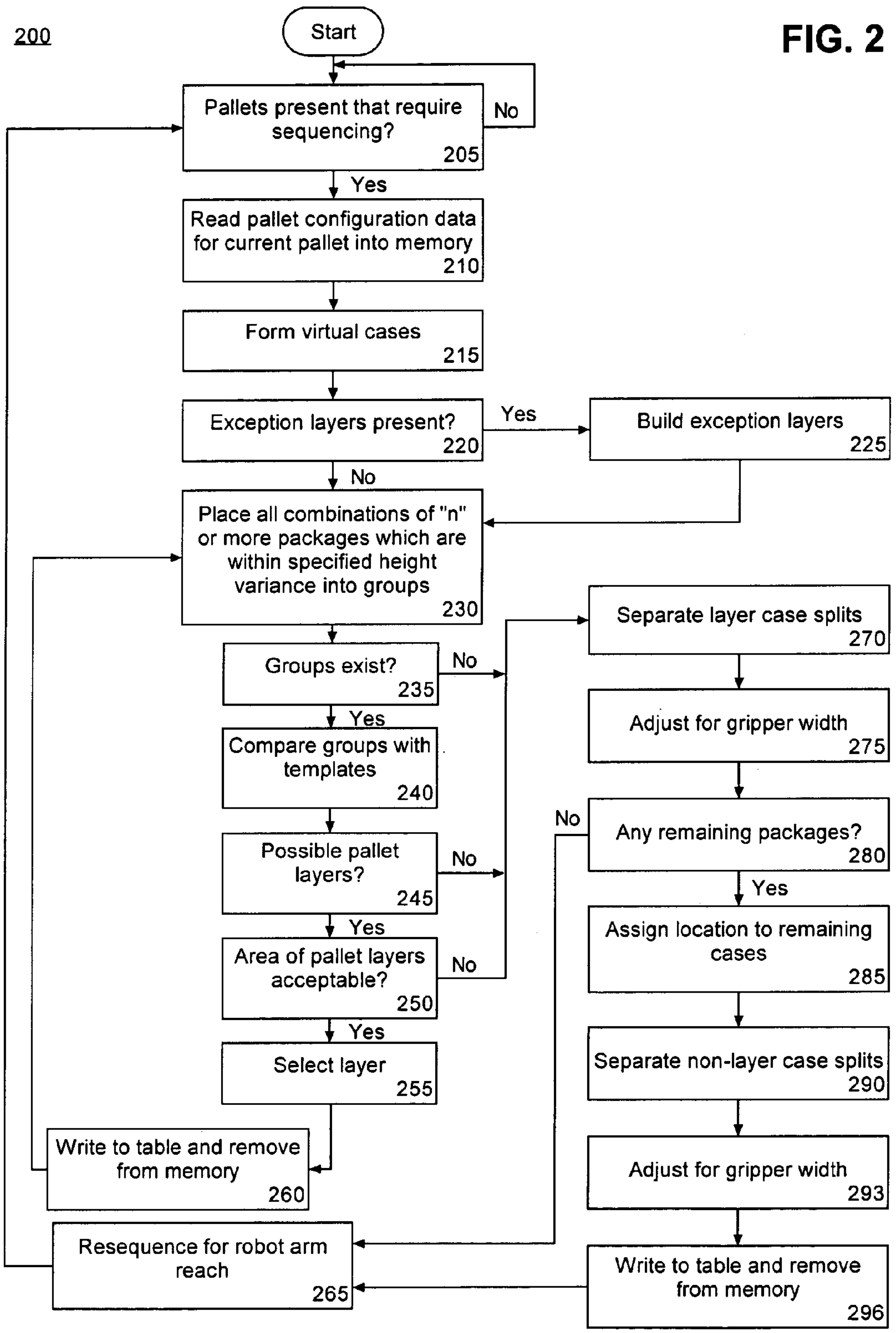
FIG. 2 is a flow chart illustrating a method of determining pallet configuration data as performed by the robot control module of FIG. 1.

FIG. 2 is a flow chart illustrating a method 200 of determining pallet configuration data for adding individual cases to a pallet as performed by the robot control module of FIG. 1. Notably, as the pallet configuration data received from the product release processor specifies full pallet layers, if any, the method 200 is intended to process only those cases which have not yet been assigned a pallet location by the product release processor. Accordingly, the method can begin in step 205, where a determination can be made as to whether one or more pallets are present which require sequencing. For example, the robot control module and the product release processor can be communicatively linked via a messaging system, a memory buffer, a shared memory, or another communications mechanism, through which the robot control module can determine whether pallet configuration data has been received or made available from the product release processor.

If pallet configuration data is detected, the method can proceed to step 210. If not, the method can continue looping through step 205 to continue monitoring for the receipt or availability of pallet configuration data. Continuing with step 210, the pallet configuration data for a selected and current pallet can be read into memory. In step 215, virtual cases can be formed. For example, case splits specified within the pallet configuration data for the current pallet can be identified and combined into a virtual case. A case split refers to a smaller case which occupies approximately one-half of the volume of a single larger case of the same product type. An example of a case split can include a case of 12 beverage containers or a "12-pack" which can be combined with another 12-pack to approximate the dimensions of a larger case of 24 beverage containers. The smaller "12 pack" cases can be referred to as case splits. The case splits can be combined into a single "virtual case", at least for purposes of assigning the case splits to a location within the pallet being determined. Accordingly, once combined, the two case splits placed side by side are treated as a single larger case until the larger virtual case is again split into its constituent case splits.

Virtual cases also can be formed of two cases which can be placed one on top of the other to approximate the height of a taller case. Accordingly, within a layer of cases, one or more cases of the layer can be formed of two shorter cases, which when stacked, are substantially the same height as the other individual cases in the same pallet layer. More particularly, the height of the vertically stacked cases falls within the height range for cases in that layer. These vertically stacked cases also can be combined into a larger virtual case for purposes of assigning the cases to a location within the pallet being determined.

In step 220, the pallet configuration data can be examined to identify any exception cases. Exception cases can be any case that does not fit one of the case layer templates nor has an irregular size. As the pallet configuration data can indicate case dimensions and/or SKUs, exception cases can be identified using either identifier. For example, particular cases which are stocked and handled by the material handling system can be flagged as exception cases. If no exception cases are identified, the method can proceed to step 230. If one or more exception cases are identified, however, the method can continue to step 225 where pallet layers can be configured which accommodate the exception cases. The robot control module can include one or more pallet layer templates specifically designed to accommodate exception cases. For example, an exception layer, as defined by an exception layer template, can be configured entirely of like or identical exception cases, or can be configured of exception cases in addition to other regular cases which are not designated as exception cases, but fit an exception pallet layer template. The exception layer can be configured with cases having heights within a predetermined range such that the exception pallet layer occupies at least a predetermined minimum area.

In step 230, the received pallet configuration data can be examined to identify all combinations of at least a predetermined number of cases "n". For example, all possible combinations of 6 or more cases which are within a predetermined height range of one another can be determined. Notably, depending upon the size of the cases being handled in relation to the size of the pallet base upon which the pallet is to be built, the minimum number of cases for a group and a pallet layer template can vary according to the smallest number of cases that can be used to form a full pallet layer. In illustration, groups of cases having a height within one-half inch of one another can be placed in the same group. As layers are built from cases of the same group, at least with respect to case by case pallet construction using a robot, the limited height deviation from case to case within the group facilitates pallet stability. Still, as noted, the height deviation of cases within a group can be a user adjusted parameter.

The groups can be determined with reference to the virtual cases determined in step 215 and also by using the constituent cases of a virtual case. For example, when determining possible groups, the virtual case can be used within a taller group. Each constituent case of the virtual case also can be used as part of another shorter group. In illustration, two vertically stackable cases, each 8 inches tall, can form a virtual case which is 16 inches tall. The virtual case can be counted as a single case for a group of cases having a height range of 16 inches to 16.5 inches. The same virtual case can be counted as part of another group of cases having a height range of 15.5 inches to 16 inches. Still, the two constituent cases, each having a height of 8 inches, can be included within a group of cases having a height range of 7.5 inches to 8 inches, and within another group of cases having a height range of 8 inches to 8.5 inches. As illustrated, cases can be listed in more than one group such that the robot control module can select a group with the most cases first. Accordingly, the maximum number of cases can be achieved for each group for purposes of forming a pallet layer.

In step 235, a determination can be made as to whether any groups exist. That is, a determination can be made as to whether at least one group of "n" cases from the available unassigned cases of the pallet exists. If so, the method can proceed to step 240. If not, however, the method can proceed to step 270.

Continuing with steps 240, 245, 250, and 255, the robot control module can begin a comparison of the groups with the available pallet layer templates to determine whether one or more pallet layers can be configured as specified by one or more of the predetermined pallet layer templates. In step 240, the various groups can be compared with the pallet layer templates.

Each of the groups can be compared with each of the templates to determine whether one or more pallet layers can be configured from the group according to the pallet layer templates. Any case arrangement matching a pallet layer template can be saved for further processing. For example, a group can be analyzed first to determine whether there are n+3 cases in the group, for example 9 cases. If so, the cases of the group are compared with the available 9 case pallet layer templates. If the available cases can be arranged to fit more than one 9 case pallet layer template, each possibility can be saved. Although the group being processed may include exactly 9 cases, the group can include more than 9 cases. For example, if the group includes 14 cases, the robot control module is programmed to begin matching permutations of the 14 cases against the 9 case pallet layer templates. As mentioned, any arrangement of 9 cases which matches a 9 case pallet layer template can be saved.

After comparison of a group with all 9 case pallet layer templates, the group can be checked as to whether it includes at least 8 cases. If so, the group can be compared with 8 case pallet layer templates and continue the comparing process down to the minimum number of cases specified for a template. According to one embodiment of the present invention, the robot control module can begin comparing groups having the largest number of cases with templates which can accommodate the largest number of cases. After one group is processed additional groups can be compared to the pallet layer templates. Regardless of the order of the comparison of groups to pallet layer templates, each group can be compared with each pallet layer template.

In step 245, a determination can be made as to whether any of the groups were matched to one or more pallet layer templates. If no possible pallet layers were determined, the method can proceed to step 270. If one or more possible pallet layers were determined, the method can proceed to step 250. In step 250, the area or footprint of the determined pallet layers can be compared. The robot control module can be configured to reject any pallet layers which do not cover or have a footprint of at least a predetermined area. The area of a pallet layer can be determined either from the template used in configuring the pallet layer or from actual measurements of cases in the pallet layer. According to one embodiment, the minimum area requirement can be at least a minimum percentage, such as 80 percent, of the area of the pallet base. If none of the possible pallet layers meets this threshold, the method can proceed to step 270. If one or more of the possible pallet layers meet the minimum area requirement, the method can proceed to step 255. It should be appreciated, however, that the area check of step 250 can be performed when groups are compared with pallet layer templates such that any possible pallet layers which do not meet the minimum area requirement are not saved.

In step 255, the robot control module can select a pallet layer having the largest area. Notably, the area determination can be made with reference to the pallet layer template used to configure that pallet layer or can be performed dynamically using actual case measurements. Regardless, the robot control module can select the pallet layer having the largest area. Still, it should be appreciated that other preferences or weighting techniques can be utilized such as favoring particular templates due to the inherent stability of a pallet built using such a pallet layer case arrangement or a combination of both area and number of cases.

In step 260, any successful pallet layer configurations can be written to memory. The cases used in the pallet layers configured by the robot control module are removed from memory or are otherwise rendered unavailable for successive pallet layer configurations to avoid mistakenly using the same case more than one time. After step 260, the method can loop back to step 230 to reformulate the groups and begin comparing the newly formed groups with the pallet layer templates.

The robot control module can maintain associations between constituent cases and virtual cases such that if a virtual case is used to construct a pallet layer, both constituent cases are removed from memory so as not to be included within the subsequently formed groups. The method can loop through steps 230–260 until no further pallet layers can be determined. Because cases and virtual cases can be included in more than one group for determining pallet layers, and then removed when assigned to a pallet layer prior to regrouping the cases, the robot control module can formulate stable and efficient pallet layers.

Continuing with step 270, in the case where no further groups remain for processing or the cases of the available groups do not match the available pallet layer templates, the case splits for any determined layers can be separated. In particular, any pallet layers determined in steps 240–255 can be analyzed to identify virtual cases made from case splits in step 215. The virtual cases which have been placed in pallet layers by the robot control module thus far can be separated back into constituent case splits. Separating the virtual case back into constituent case splits ensures that when the pallet configuration data is provided to the material handling machinery, the robotic system will be aware that two smaller cases are to be placed rather than one larger case.

In step 275, the pallet layers which have been configured by the robot control module can be adjusted to accommodate the case grasping mechanism of the robot. The pallet layer templates assume that cases will be placed immediately next to one another with minimal space, if any, disposed between each case. Such an arrangement, however, does not permit the case grasping mechanism of the robot to place cases on a pallet without making contact with previously placed cases. Contact between the robot and previously placed cases risks shifting cases thereby causing the resulting pallet to be misaligned. In consequence, the pallet layers must be reconfigured so that sufficient space exists between each case of a pallet layer to permit the placement of each case by the robot and case grasping mechanism. As the required distance between each case can vary according to the particular robot and case grasping mechanism used, the distance can be a configurable parameter. For purposes of discussion, however, the distance between each case of a pallet layer can be set to one-half inch.

In step 280, a determination can be made as to whether any cases specified by the pallet configuration data remain to be processed or placed within the pallet. If so, the method can proceed to step 285. If not, the method can proceed to step 265. In step 285, the robot control module can assign locations to the remaining cases. The robot control module can determine the pallet configuration information for the remaining cases which cannot be matched to available templates. The cases can be assigned to locations within the current pallet using any of a variety of third party plug-ins or algorithms which determine optimal case configurations. One such example is Cube IQ load optimization software available from MagicLogic Optimization Inc.

In step 290, the non-layer case splits, that is any virtual cases that were assigned a location in step 285 can be separated into constituent case splits. In step 293, the cases which were assigned locations in step 285 can be reconfigured to accommodate for the robot and case grasping mechanism as discussed with reference to step 275. The pallet configuration data determined throughout steps 270–296 can be written to a data store as previously discussed. The cases that were assigned locations within the current pallet in step 285 can be removed from memory.

Proceeding to step 265, the cases of the pallet layers can be resequenced for placement by the robot arm for proper reach. More particularly, as the placement of each case to be included within a pallet has been determined, the robot arm can be programmed to place each case on the pallet without colliding with previously placed cases, whether the cases were placed by the robot or another case loading mechanism.

As the pallet configuration data specifies the placement of each case in the pallet and the case dimensions, the entry point and exit point for the robot arm when placing cases can be determined. More particularly, the pallet configuration data specifies an X, Y, and Z coordinate specifying the location of each case within the pallet in addition to the orientation of the case. Accordingly, the X, Y, and Z points along the path of travel of the robot can be determined including any entry points and exit points. Notably, the entry point and exit point can be determined, at least in part, with reference to the coordinates of the present case being placed on the pallet. That is, when entering and exiting the space to be occupied by cases of a pallet when placing a case, the robot arm can be programmed to rise a predetermined height above the top of the case being placed prior to initiating any lateral movement. As the case dimensions are known, the case grasping mechanism also can be programmed to suitably grasp each case. Each case can be placed in the center of the pallet layer template location or segment to which the case has been assigned. After completion of step 265, the method can proceed to step 205 to repeat as necessary.

While the method described in reference to FIG. 2 illustrates one aspect of the present invention, it should be appreciated that the present invention can include additional embodiments. According to one embodiment of the present invention, particular pallet layer templates can be favored or weighted more than others. For example, a 7 case pallet layer can be favored as being more stable than other pallet layers. Additionally, adjacent pallet layers, whether built from the same template or not, can be selectively rotated approximately 180 degrees to promote case interlock among pallet layers and to avoid the stacking of cases into columns which typically results in less case interlock and less pallet stability. Also to promote case interlock, the robot control module can be configured to place pallet layers such that a same pallet layer template, is not used for more than a predetermined number of pallet layers which are to be placed in sequence one on top of the other. Thus, for example, not only can layers of 6 cases, then layers of 7 cases be placed in sequence on a pallet, but layers of the same number of cases wherein a different case arrangement is specified can be assigned sequentially to a pallet.

According to another embodiment of the present invention, the tallest cases of a given group which are to be included within a pallet layer can be located at the corners of the pallet layer. Locating the cases having the largest height in comparison with other cases within the pallet layer in the corner positions promotes pallet stability. Specifically, the cases of the next pallet layer, that is the pallet layer to be placed atop of the current pallet layer, are more likely to lean in towards one another rather than lean outward. In consequence, the pallet is less susceptible to collapse.

The robot control module also can be configured to optionally place a final pallet layer of cases which do not conform to a given height requirement. That is, a layer of cases having disparate heights which need not fall within the defined height tolerance for a group, can be placed. The cases can be placed according to a template or can be placed such that the cases occupy a minimum area without reference to a template. If no template is used, additional constraints can be applied such as ensuring that the perimeter of the layer falls within a predetermined range. In any case, each case of the final layer can be regarded as an independent zone which can be provided to the third party plug-in. Accordingly, the final layer would provide a number of individual platforms for receiving additional cases that is equal to the number of cases in the layer rather than serving as a single platform the size of the entire layer. Thus, if the layer had 7 cases, each of the 7 cases can be regarded as an individual space for receiving additional cases. As noted, such a configuration can be optional in that the feature can be inactivated or can be selectively activated, for example in cases wherein the number of cases left to be placed on a pallet does not exceed a predetermined maximum number of cases.

Figure 3:
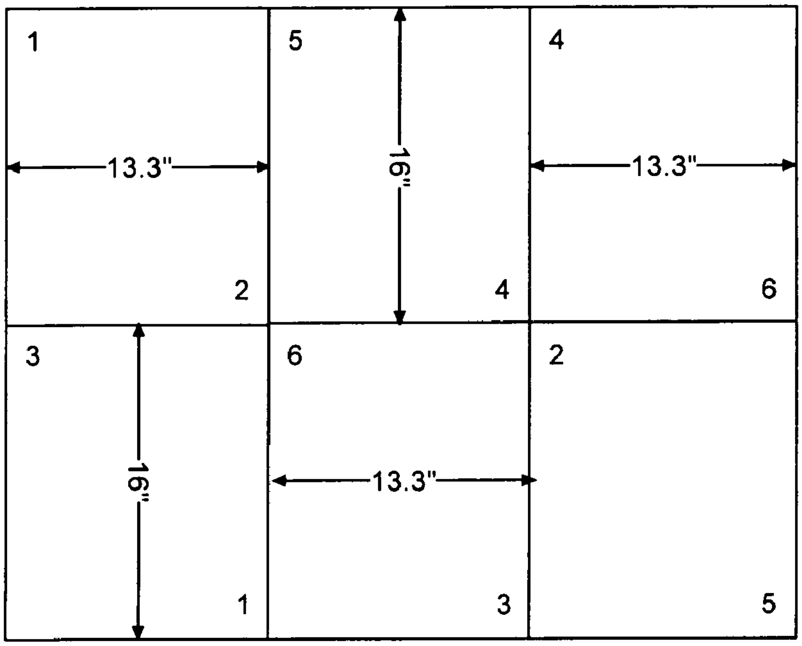
FIGS. 3 and 4 are schematic diagrams illustrating visual representations of 6 case pallet layer templates for use with the present invention.
Figure 3:
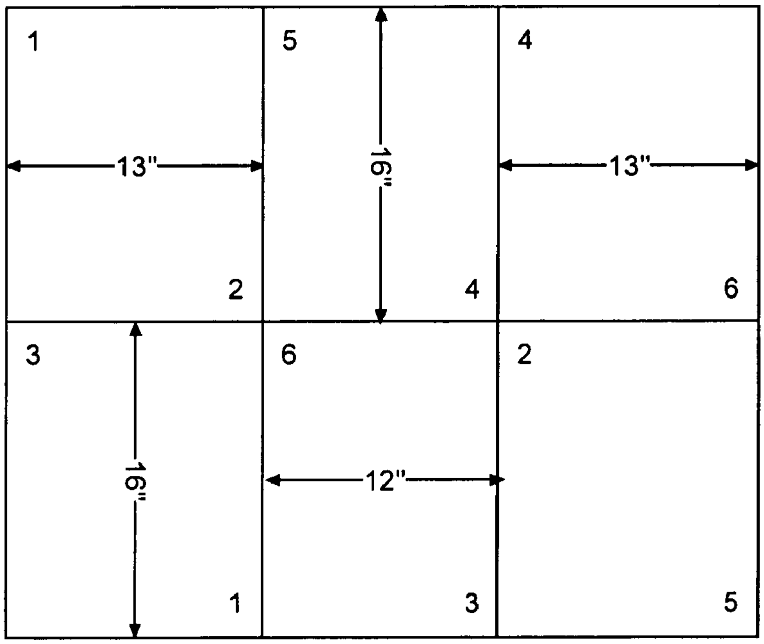

FIG. 3 is a schematic diagram illustrating visual representations 300 and 310 of two different 6 pallet layer templates. The visual representations 300 and 310 illustrate the overhead view or footprint of the pallet layer. As shown, visual representation 300 occupies a larger area than visual representation 310. The pallet layer template having the largest area can be used or preferred in cases wherein the robot is to place pallet layers on a fresh pallet, that is a pallet base not having any existing layers. Although the dimensions can be varied for differently sized pallets, the templates disclosed herein can be suitable for placing beverage containers on 40 inch by 32 inch pallets. The pallet layer template represented by view 310 can be selected in situations where the robot is to place layers onto a pallet already having layers which were placed by either the full layer gantry or the palletizer.

Notably, pallets already having layers can be provided to a securing station such as a stretch-wrapper. As a result of the securing process, cases typically are cinched together such that the area of a pallet layer becomes less than had the pallet not been secured. Accordingly, the pallet layer template represented by view 310 can be used when a pallet already has one or more layers of cases which have been secured, and therefore, has less of a stackable area or surface available upon which a next pallet layer can be build and/or placed. Likewise, the pallet layer templates illustrated by views 410, 510, 610, 710, 810, 910, and 1010 can be used when a pallet has secured layers already placed.

In determining whether a pallet layer can be built, and whether a group matches one or more pallet layer templates, the cases of a given group, that is cases having a height within a predetermined range of one another, are compared in terms of length and width with the individual locations of the pallet layer templates. More particularly, each case assigned to a location of a pallet layer template must fit within the length and width dimensions specified for that location of the pallet layer template. A case must not exceed the specified length and width of the location in the pallet layer template to which the case was assigned.

The length and width of a case, however, can be smaller than the specified dimensions of the location in the pallet layer template to which the case was assigned. If so, the case can be positioned in the center of its assigned pallet layer template location. For example, if the length and/or width of a case is less than the specified length and/or width for its assigned location in the pallet layer template, space may exist between that case and other cases of the same pallet layer. As more than one case of a pallet layer may be smaller than the dimensions of their assigned pallet layer template locations, space can exist between one or more cases of the same pallet layer. As mentioned, the minimum area requirement, which can be calculated using actual measurements of cases assigned to a pallet layer, can ensure that the pallet layer occupies a minimum area, and therefore, provides a stable base or foundation upon which additional pallet layers can be placed and/or built.

Additionally, the robot control module can sort the cases of each group according to height. The numbers located in the upper left-hand corner of the cases of the visual representations 300 and 310 indicate relative heights of the cases to be placed within a similarly configured pallet layer. For example a “1” in the upper left hand corner indicates that the case in that position of the layer is to be the tallest case, or the case having the greatest height, of all the other cases within that pallet layer. A “2” indicates that the case is the second tallest, and so on. Thus, as shown, the cases having the largest height can be located in the corners of the pallet layer. According to another embodiment of the present invention, however, the four corner cases of a pallet layer can be the tallest cases of the pallet layer and need not be positioned in a particular corner as illustrated in FIG. 3.

The number located in the lower right hand corner of the cases indicates the order in which the case is to be physically placed in the pallet layer by the robot. The pallet layer case placement order facilitates the placement of cases which are farthest from the robot arm first. Still, although each individual pallet layer template specifies the order in which cases are to be placed by the robot, it should be appreciated that a given pallet layer need not be completely placed by the robot before the robot begins placing cases from another layer above. This enables the robot to build the pallet beginning in the locations farthest from the robot as well as build distant portions of the pallet in height prior to placing cases closer to the robot so as to avoid collisions with placed cases.

Figure 4:
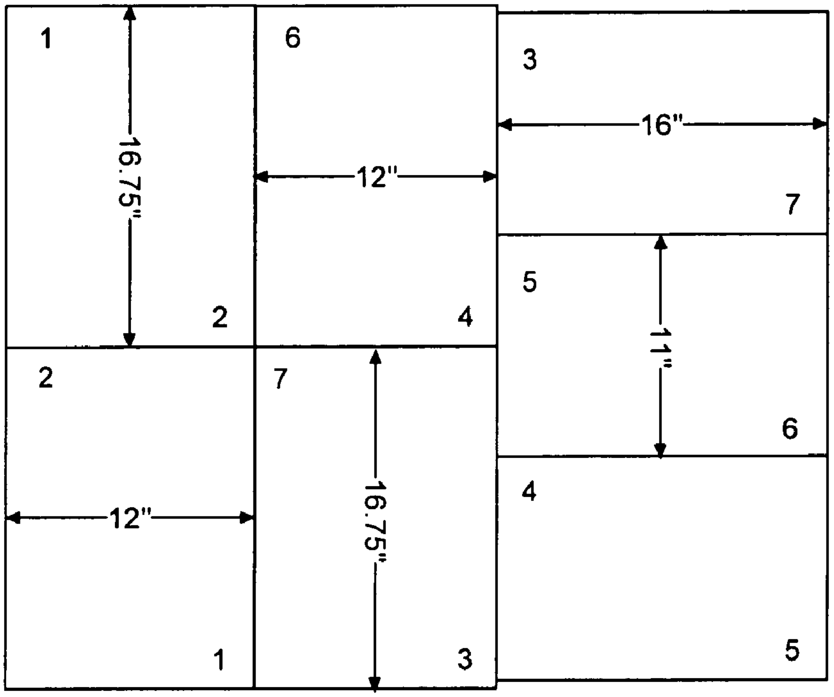
Figure 4:
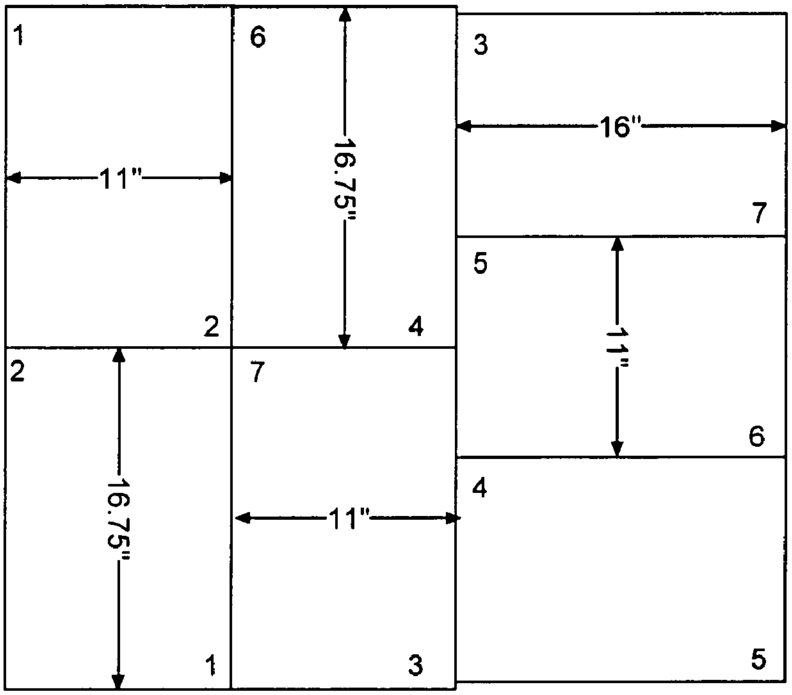
Figure 5:
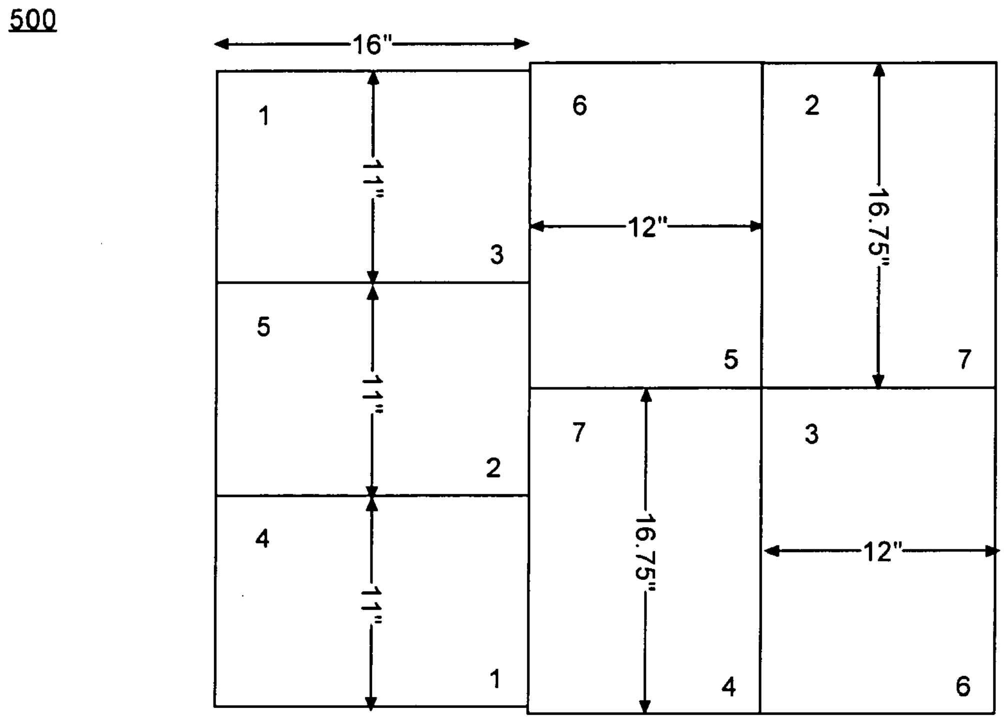
FIG. 5 is a schematic diagram illustrating visual representations of 7 case pallet layer templates for use with the present invention.
Figure 5:
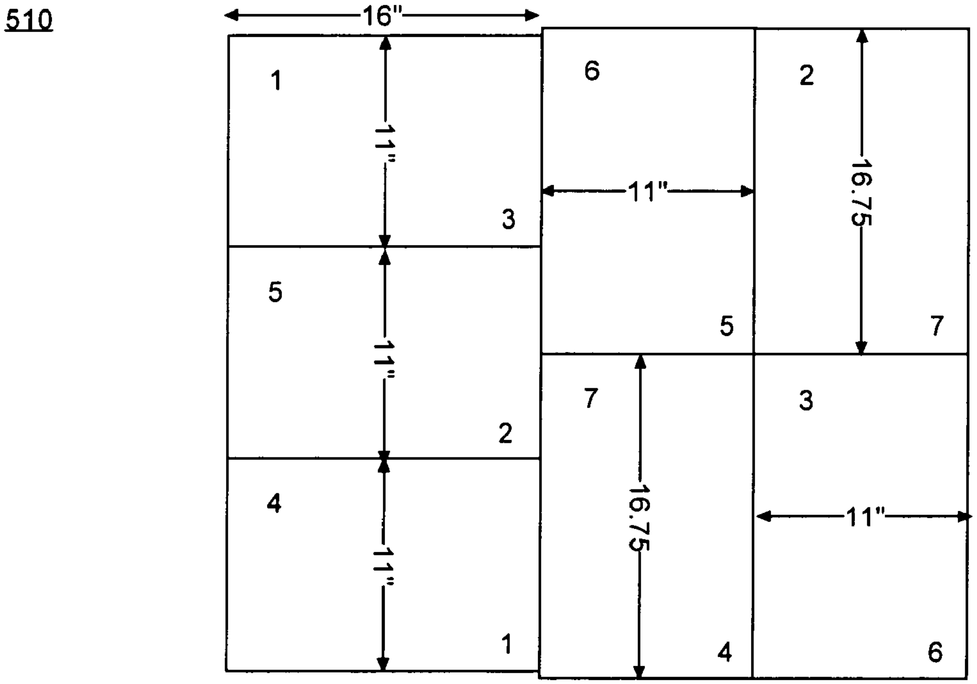

FIGS. 4 and 5 are schematic diagrams, each illustrating visual representations of two 7 case pallet layer templates. FIG. 4 shows visual representations 400 and 410 and FIG. 5 depicts visual representations 500 and 510. Notably, when determining whether cases of a group match a given pallet layer template, each case must be sized to fit completely within a location of the pallet layer template. If, for example, a group of cases can fit both templates 400 and 410, then the template which utilizes the most volume, as computed according to actual case dimensions, is selected.

Figure 6:
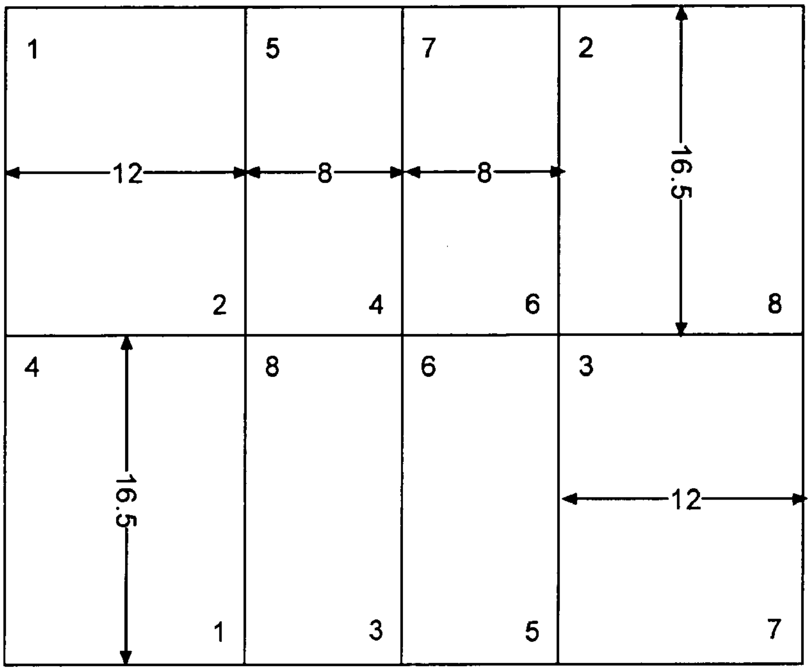
FIGS. 6, 7, 8, and 9 are schematic diagrams illustrating visual representations of 8 case pallet layer templates for use with the present invention.
Figure 6:
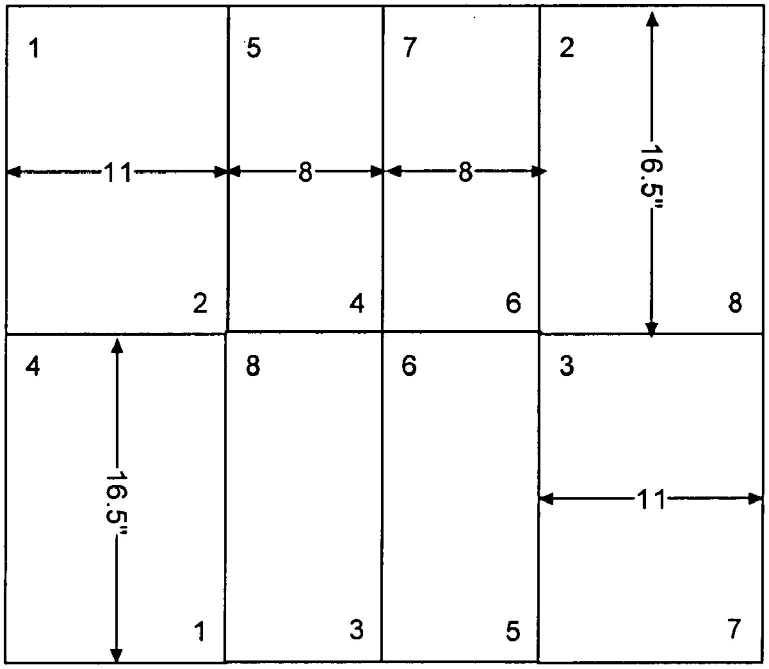
Figure 7:
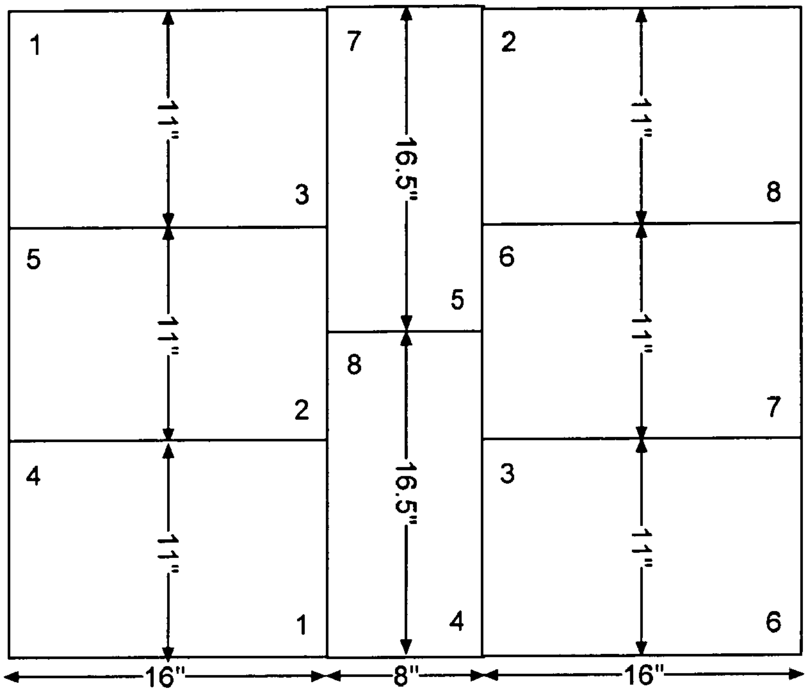
Figure 7:
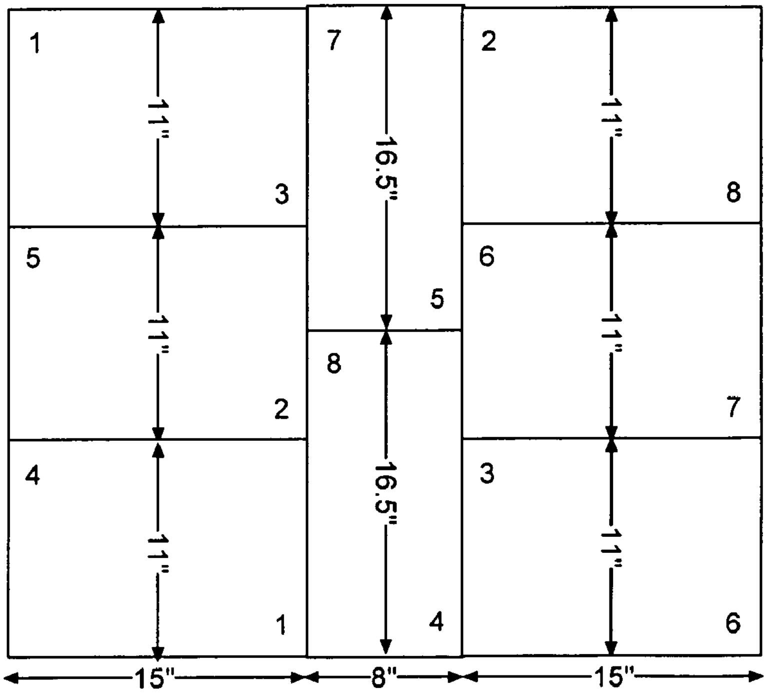
Figure 8:
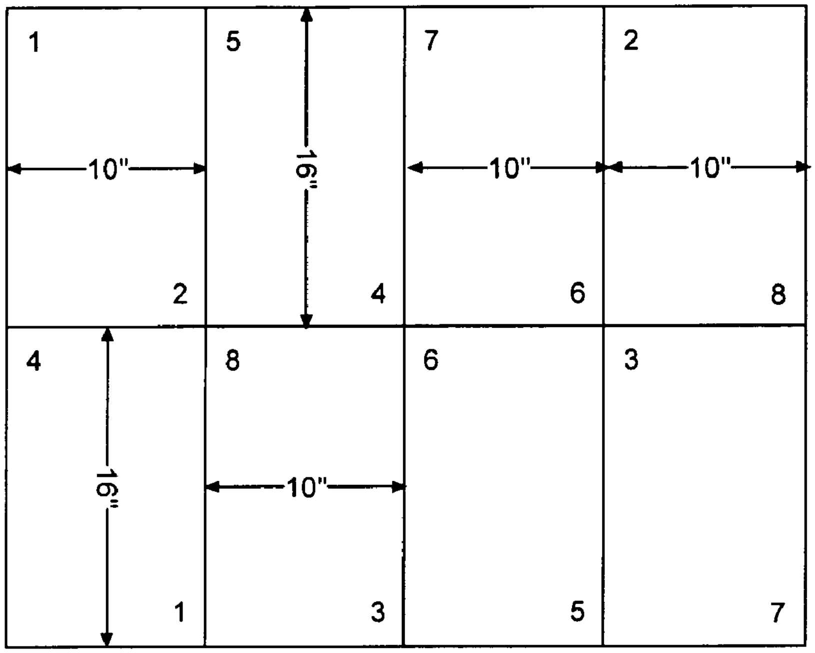
Figure 8:
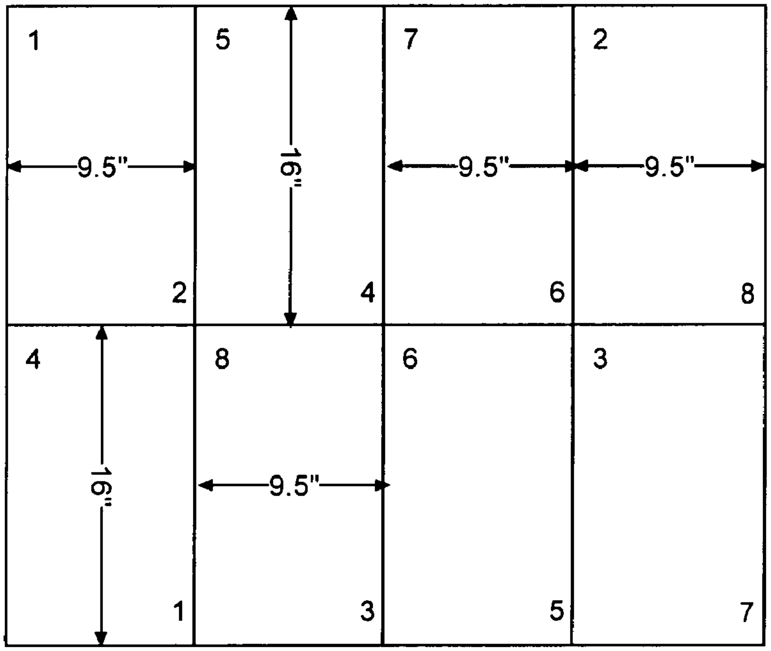
Figure 9:
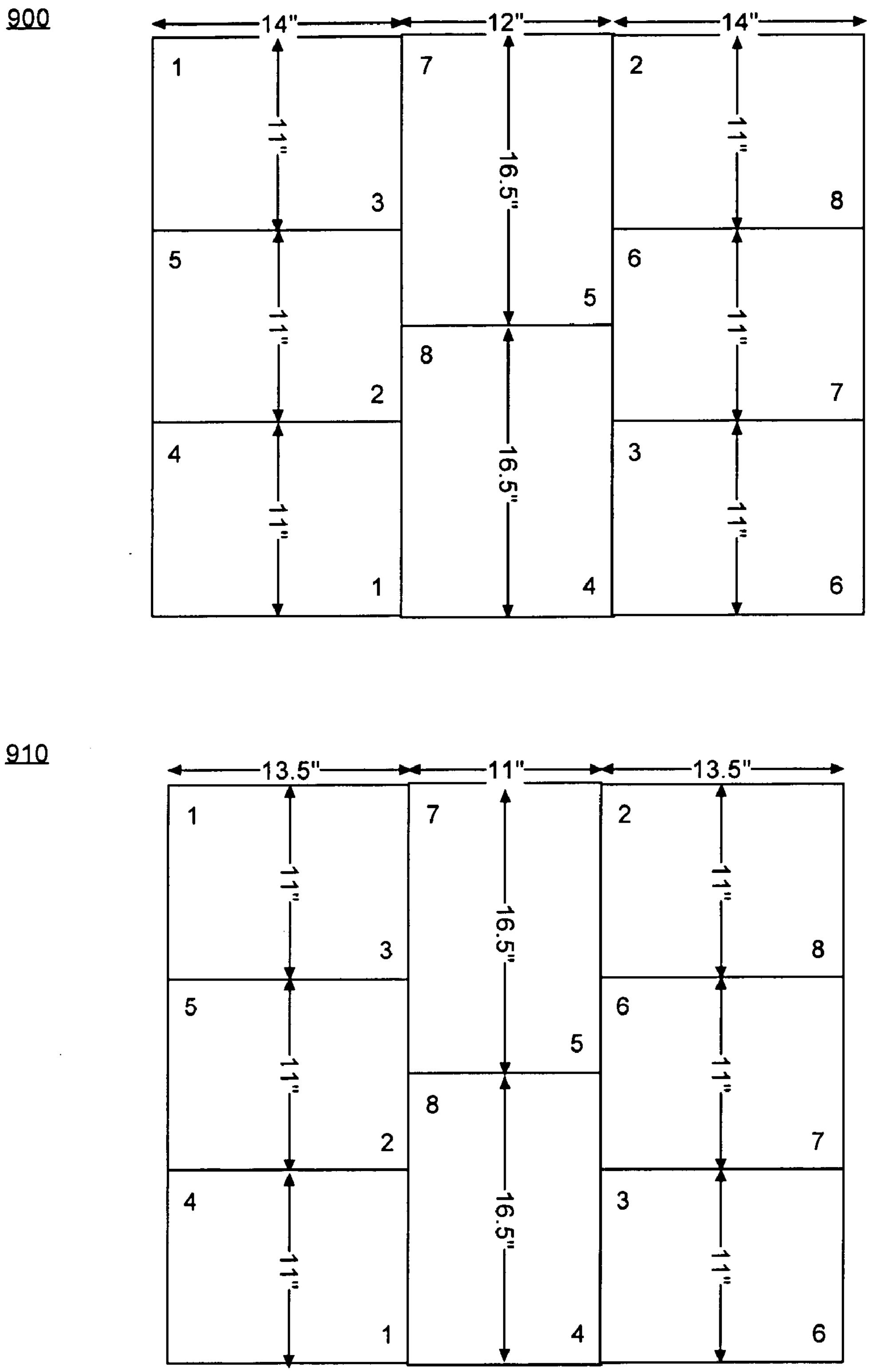

FIGS. 6, 7, 8, and 9 are schematic diagrams, each illustrating visual representations of two different 8 case pallet layer templates. FIG. 6 depicts visual representations 600 and 610 and FIG. 7 shows visual representations 700 and 710. FIG. 8 depicts visual representations 800 and 810 and FIG. 9 shows visual representations 900 and 910.

Figure 10:
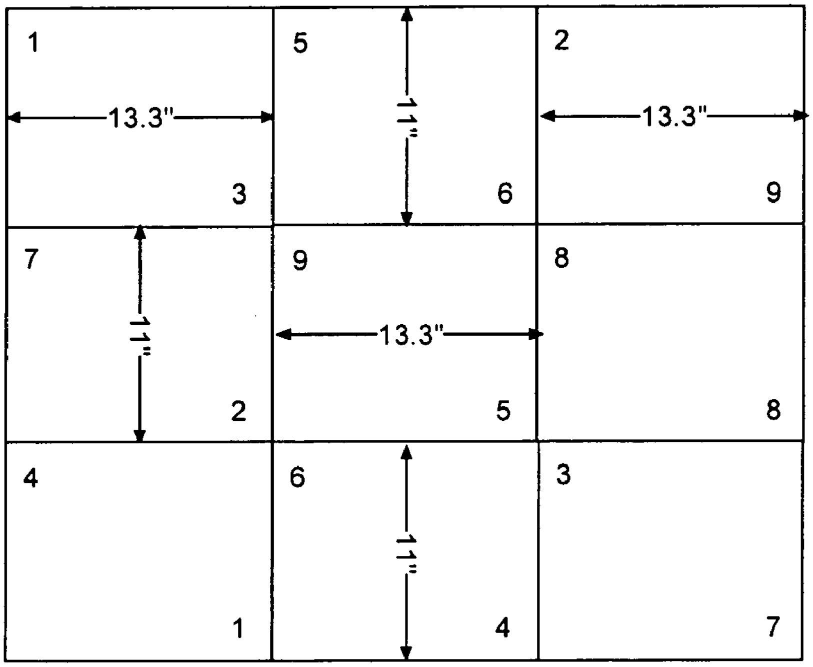
FIG. 10 is a schematic diagram illustrating visual representations of 9 case pallet layer templates for use with the present invention.
Figure 10:
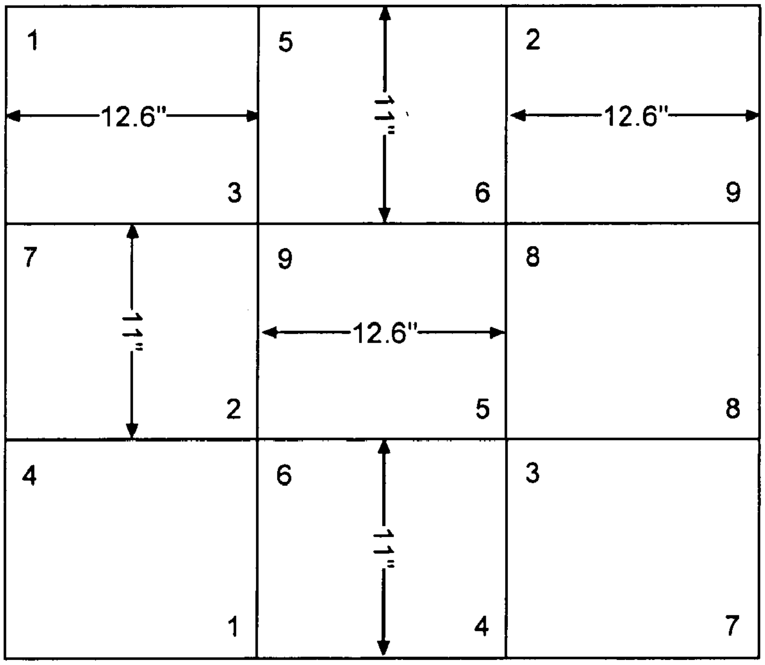

FIG. 10 is a schematic diagram illustrating visual representations 1000 and 1010 of two different 9 case pallet layer templates.

Yet another embodiment of the present invention can include determining pallet layers without using templates. According to such an embodiment, cases can be classified into groups based upon height as discussed. Rather than building pallet layers according to templates, pallet layers can be configured using cases of the same group with reference to a maximum and minimum area which must be filled. Additional constraints with regard to the perimeter not being substantially less than or greater than the pallet base or a previous layer also can be applied. Notably, such an embodiment can assign cases to locations within a given layer. When assigning cases for a next layer, the robot control module can ensure that cases interlock such that columns are avoided. For example, rules can be followed which would prohibit a layer from being formed which allows a column of more than a predetermined number of cases to exist. Accordingly, each layer need not completely interlock, although such a goal can be achieved. By specifying the maximum height of a column, stable pallet layers can be achieved. Although pallet layers can be built with substantially straight and vertical edges, this embodiment also can configure a pallet in a pyramid fashion.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A machine-readable storage, having stored thereon a computer program having a plurality of code sections executable by a machine for causing the machine to perform the steps of:

identifying cases for inclusion on a pallet;

identifying case dimension information for the cases;

using the case dimension information, classifying the cases into at least one group, wherein each group is defined by a height range such that cases classified within a group have a height within the height range associated with that group; and assigning cases of one of the groups to locations within a same pallet layer, wherein the pallet layer has an area within a predefined area range.

2. The machine-readable storage of claim 1, further comprising:

building the pallet as specified by the assigned case locations using an automated material handling system.

3. The machine-readable storage of claim 1, further comprising:

marking cases assigned to a pallet layer as being unavailable; and for cases which are available, performing said classifying step and said assigning step to form additional pallet layers, wherein said assigning step assigns cases to each layer such that no column of more than a predetermined number of cases in height is formed in the pallet layers.

4. The machine-readable storage of claim 3, further comprising:

building the pallet as specified by the assigned case locations using an automated material handling system configured with the robot.

5. The machine-readable storage of claim 3, wherein an area of one of the layers is less than or equal to an area of another layer immediately beneath.

6. The machine-readable storage of claim 3, wherein an area of one of the layers is greater than an area of another layer immediately beneath.

7. The machine-readable storage of claim 1, further comprising:

combining case splits into a single virtual case for treatment as a single case for said classifying and assigning steps.

8. The machine-readable storage of claim 7, further comprising:

identifying the virtual case after assigning the virtual case to a location within a pallet and separating the virtual case into constituent case splits.

9. The machine-readable storage of claim 1, further comprising:

sorting cases of the groups according to height, wherein said assigning step further comprises assigning taller cases of a group to corner locations of the pallet layer.

10. The machine-readable storage of claim 1, further comprising:

comparing cases of at least one group with at least one pallet layer template specifying an arrangement of cases forming a pallet layer, wherein said assigning step assigns cases of at least one of the groups to a layer of the pallet according to a matched pallet layer template.

11. The machine-readable storage of claim 10, further comprising:

building the pallet as specified by the assigned case locations using an automated material handling system.

12. The machine-readable storage of claim 10, said comparing step further comprising:

if the pallet has been assigned at least one layer of cases which are to be secured, comparing cases of each group with pallet layer templates designated for pallets having secured layers of cases.

13. The machine-readable storage of claim 10, further comprising:

assigning cases of at least one of the groups to a different layer of the pallet according to a matched pallet layer template; and orienting the different layer so that the orientation of the different layer is substantially perpendicular to the orientation of a layer beneath the different layer.

14. The machine-readable storage of claim 13, further comprising:

building the pallet as specified by the assigned case locations using an automated material handling system.

15. The machine-readable storage of claim 10, further comprising:

assigning cases of at least one of the groups to a different layer of the pallet according to a different matched pallet layer template such that cases of both layers interlock with one another.

16. The machine-readable storage of claim 15, further comprising:

building the pallet as specified by the assigned case locations using an automated material handling system.

17. The machine-readable storage of claim 10, further comprising:

combining case splits into a single virtual case for treatment as a single case for said comparing and assigning steps.

18. The machine-readable storage of claim 17, further comprising:

identifying the virtual case after assigning the virtual case to a location within a pallet and separating the virtual case into constituent case splits.

19. The machine-readable storage of claim 10, further comprising:

adjusting the spacing between each case of the layer to accommodate a robotic case grasping mechanism.

20. The machine-readable storage of claim 10, said assigning step comprising:

matching cases of a group to a pallet layer template specifying a case arrangement for a higher number of cases before matching cases of the group to a pallet layer template specifying a case arrangement for a smaller number of cases.

21. The machine-readable storage of claim 10, further comprising:

if the cases of a group match more than one pallet layer template, selecting a pallet layer template specifying a largest number of cases.

22. The machine-readable storage of claim 10, further comprising:

identifying at least one exception case within the cases;

assigning the at least one exception case to an exception layer; and adding at least one of an additional exception case or a non-exception case to the exception layer as specified by an exception pallet layer template.

23. The machine-readable storage of claim 10, wherein the layer determined in said assigning step has a perimeter not substantially exceeding a perimeter of a pallet base.

24. The machine-readable storage of claim 23, wherein the perimeter of the layer is less than the perimeter of the pallet base.

25. The machine-readable storage of claim 10, further comprising:

sorting cases of the groups according to height, wherein said assigning step further comprises assigning taller cases of a group to corner locations of the pallet layer.

26. The machine-readable storage of claim 10, further comprising:

if the cases of a group match more than one pallet layer template, selecting the pallet layer template which produces a pallet layer having the largest area.

27. The machine-readable storage of claim 1, further comprising:

marking cases assigned to a pallet layer as being unavailable; and for cases which are available, performing said classifying step and said assigning step to form additional pallet layers, wherein said assigning step assigns cases to each layer such that no column of more than a predetermined number of cases in height is formed in the pallet layers.

28. The machine-readable storage of claim 2, wherein the automated material handling system is configured with a robot.

29. The machine-readable storage of claim 11, wherein the automated material handling system is configured with a robot.

30. The machine-readable storage of claim 14, wherein the automated material handling system is configured with a robot.

31. The machine-readable storage of claim 16, wherein the automated material handling system is configured with a robot.

* * * * *